US012438426B2

(12) United States Patent
Yao et al.

(10) Patent No.: US 12,438,426 B2
(45) Date of Patent: Oct. 7, 2025

(54) ADJUSTABLE AIR GAP AXIAL FLUX MOTOR (71) Applicant: GM Global Technology Operations LLC, Detroit, MI (US)

(72) Inventors: Jian Yao, Shanghai (CN); Alan G. Holmes, Clarkston, MI (US); Chengwu Duan, Shanghai (CN); Vincent Fedida, Shanghai (CN); Denghao Fan, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 338 days.

(21) Appl. No.: 18/159,793

(22) Filed: Jan. 26, 2023

(65) Prior Publication Data
US 2024/0178732 A1    May 30, 2024

(30) Foreign Application Priority Data
Nov. 28, 2022   (CN) .......................... 202211498240.X (51) Int. Cl.
*H02K 21/02*   (2006.01)
*H02K 1/27*    (2022.01)

(52) U.S. Cl.
CPC ............. *H02K 21/026* (2013.01); *H02K 1/27* (2013.01); *H02K 2201/03* (2013.01); *H02K 2213/09* (2013.01)

(58) Field of Classification Search
CPC ....... H02K 21/26; H02K 21/026; H02K 21/24
USPC ......................................................... 310/190
See application file for complete search history.

(56) References Cited

U.S. PATENT DOCUMENTS

| 6,712,512 B2 | 3/2004 | Teramach et al. |
| 2009/0212728 A1* | 8/2009 | Yagi .......................... B62M 7/12 |
| | | 310/209 |
| 2012/0262095 A1* | 10/2012 | Smith ..................... H02K 21/24 |
| | | 310/90 |
| 2015/0108856 A1* | 4/2015 | Sakamoto ............ H02K 21/026 |
| | | 310/80 |

(Continued)

FOREIGN PATENT DOCUMENTS

| EP | 4037166 A1 | 8/2022 |
| JP | 2008048497 A * | 2/2008 |

(Continued)

OTHER PUBLICATIONS

English Translation of WO 2005076463 A1 (Year: 2005).*

(Continued)

*Primary Examiner* — Terrance L Kenerly
*Assistant Examiner* — Theodore L Perkins
(74) *Attorney, Agent, or Firm* — CANTOR COLBURN LLP (57) ABSTRACT An axial flux motor may include a stator, a rotor including a rotor frame and having a rotational axis, an axial air gap separating the stator and the rotor, the axial air gap corresponding to an axial position of the rotor frame, and at least one hydraulic actuator including a variable volume hydraulic fluid chamber defined within the rotor frame, wherein a change in the volume of the variable volume hydraulic fluid chamber causes a change in the axial position of the rotor frame and a corresponding change in the axial air gap separating the stator and the rotor.

19 Claims, 5 Drawing Sheets (56) References Cited

U.S. PATENT DOCUMENTS

2017/0279400 A1* 9/2017 Nadarajan ............ H02K 1/2798
2019/0386551 A1* 12/2019 Sasaki ...................... H02K 3/28
2020/0353596 A1   11/2020 Tseng et al.

FOREIGN PATENT DOCUMENTS

WO    WO-2005076463 A1 *  8/2005  ............... B60K 6/26
WO    WO-2009144979 A1 * 12/2009  ........... E03C 1/0404

OTHER PUBLICATIONS

English Translation of WO 2009144979 A1 (Year: 2009).*
English Translation of JP 2008048497 A (Year: 2008).*
German Office Action for German Application No. 10 2023 104 532.6; Report Mail Date Aug. 29, 2023 (5 Pages).

* cited by examiner

ADJUSTABLE AIR GAP AXIAL FLUX MOTOR

CROSS-REFERENCE TO RELATED APPLICATIONS

This application claims priority to Chinese Patent Application No. 202211498240.X, filed Nov. 28, 2022, the contents of which are incorporated by reference herein in their entirety.

INTRODUCTION

The subject disclosure relates to permanent magnet (PM) axial flux (AF) motors. PM motors may produce back-EMF within the stator windings proportional to the motor speed and air gap field strength. Without some type of field weakening above base speed operation, a PM motor may be speed and torque limited.

SUMMARY

In one exemplary embodiment, an axial flux motor may include a stator, a rotor including a rotor frame and having a rotational axis, an axial air gap separating the stator and the rotor, the axial air gap corresponding to an axial position of the rotor frame, and at least one hydraulic actuator including a variable volume hydraulic fluid chamber defined within the rotor frame, wherein a change in the volume of the variable volume hydraulic fluid chamber causes a change in the axial position of the rotor frame and a corresponding change in the axial air gap separating the stator and the rotor.

In addition to one or more of the features described herein, the at least one hydraulic actuator may be a linear hydraulic actuator.

In addition to one or more of the features described herein, the at least one hydraulic actuator may be a rotary hydraulic actuator.

In addition to one or more of the features described herein, the axial flux motor may further include a motor output shaft having a passage communicating a hydraulic fluid to and from the variable volume hydraulic fluid chamber.

In addition to one or more of the features described herein, the at least one hydraulic actuator may include a plurality of variable volume hydraulic fluid chambers.

In addition to one or more of the features described herein, the at least one hydraulic actuator may include a plurality of hydraulic actuators angularly distributed around the rotor.

In addition to one or more of the features described herein, the axial flux motor may further include a motor output shaft having a passage communicating hydraulic fluid to the variable volume hydraulic fluid chamber, wherein the variable volume hydraulic fluid chamber may include a cavity in the rotor frame enclosing a vein plate, the vein plate extending radially outward from a cylindrical base surrounding the motor output shaft, the cylindrical base affixed to the motor output shaft such that the cylindrical base is rotationally and axially fixed relative to the motor output shaft, the rotor frame affixed to the cylindrical base such that the rotor frame is axially translatable.

In addition to one or more of the features described herein, the axial flux motor may further include a motor output shaft including a passage communicating hydraulic fluid to the variable volume hydraulic fluid chamber, wherein the variable volume hydraulic fluid chamber may include a cavity in the rotor frame enclosing a vein plate, the vein plate extending radially outward from the motor output shaft, the vein plate affixed to the motor output shaft such that the vein plate is rotationally fixed relative to the motor output shaft and axially translatable relative to the motor output shaft, the rotor frame affixed to the motor output shaft such that the rotor frame is rotationally and axially translatable relative to the motor output shaft.

In addition to one or more of the features described herein, the rotor frame may be affixed to the motor output shaft by a lead screw coupling.

In addition to one or more of the features described herein, the lead screw coupling may include a ball screw.

In addition to one or more of the features described herein, the axial flux motor may include a disc spring compressible during the change in the axial position of the rotor frame.

In addition to one or more of the features described herein, the axial flux motor may further include a binary fluid control valve having a first state providing the hydraulic fluid to the hydraulic fluid chamber and a second state exhausting the hydraulic fluid from the hydraulic fluid chamber.

In addition to one or more of the features described herein, the rotor may include surface mounted permanent magnets.

In another exemplary embodiment, an axial flux motor may include a stator, a rotor including a rotor frame and having a rotational axis, an axial air gap separating the stator and the rotor, the axial air gap corresponding to an axial position of the rotor frame, a motor output shaft, at least one hydraulic actuator including a variable volume hydraulic fluid chamber defined within the rotor frame, the variable volume hydraulic fluid chamber may include a cavity in the rotor frame enclosing a vein plate, the vein plate extending radially outward from a cylindrical base surrounding the motor output shaft, the cylindrical base affixed to the motor output shaft such that the cylindrical base is rotationally and axially immovable relative to the motor output shaft, the rotor frame affixed to the cylindrical base such that the rotor frame is axially translatable, wherein a change in the volume of the variable volume hydraulic fluid chamber causes a change in the axial position of the rotor frame and a corresponding change in the axial air gap separating the stator and the rotor, the motor output shaft communicating a hydraulic fluid to and from the variable volume hydraulic fluid chamber, and a binary fluid control valve having a first state providing the hydraulic fluid to the hydraulic fluid chamber and a second state exhausting the hydraulic fluid from the hydraulic fluid chamber.

In addition to one or more of the features described herein, the axial flux motor may further include a spring biasing the rotor away from the stator when compressed.

In addition to one or more of the features described herein, the axial flux motor may further include a spring biasing the rotor toward from the stator when compressed.

In yet another exemplary embodiment, an axial flux motor may include a rotational axis of the motor, a stator having a pair of axial sides, a rotor including a respective rotor structure on each axial side of the stator, each rotor structure including a rotor frame, a respective axial air gap separating the stator and each respective rotor structure, each axial air gap corresponding to an axial position of the corresponding rotor frame, for each rotor structure, at least one respective hydraulic actuator may include a corresponding variable volume hydraulic fluid chamber defined within the respective rotor frame, wherein a change in the volume of the corresponding variable volume hydraulic fluid chamber causes a change in the axial position of the respective rotor frame and a corresponding change in the corresponding axial air gap separating the stator and the respective rotor structure, and a binary fluid control valve having a first state providing a hydraulic fluid to each variable volume hydraulic fluid chamber and a second state exhausting the hydraulic fluid from each variable volume hydraulic fluid chamber.

In addition to one or more of the features described herein, for each rotor structure the at least one respective hydraulic actuator may be a linear hydraulic actuator.

In addition to one or more of the features described herein, for each rotor structure the at least one respective hydraulic actuator may be a rotary hydraulic actuator.

In addition to one or more of the features described herein, for each rotor structure the corresponding variable volume hydraulic fluid chamber may include a respective cavity in the respective rotor frame enclosing a respective vein plate, the respective vein plate extending radially outward from a respective cylindrical base surrounding a motor output shaft, the respective cylindrical base affixed to the motor output shaft such that the respective cylindrical base is rotationally and axially fixed relative to the motor output shaft, the respective rotor frame affixed to the respective cylindrical base such that the respective rotor frame is axially translatable.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
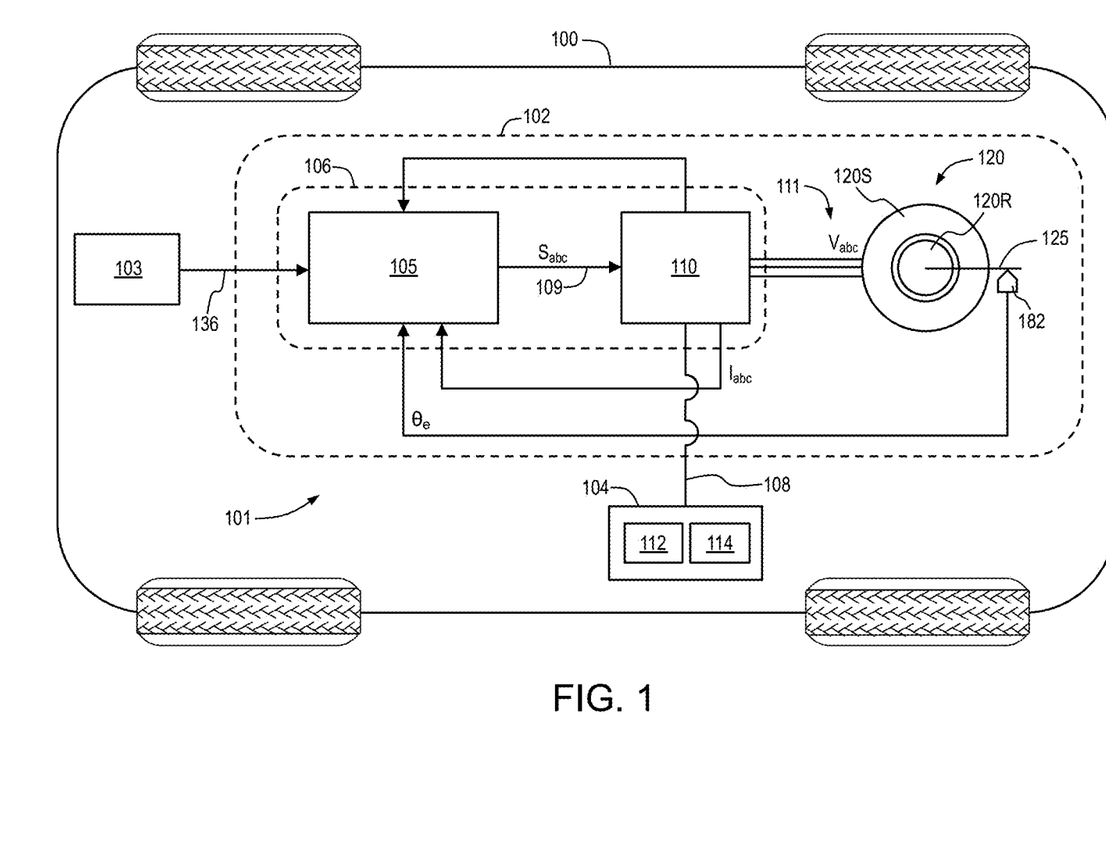
FIG. 1 illustrates an electrified vehicle, in accordance with one or more embodiments.

FIG. 1 schematically illustrates an embodiment of an electric propulsion system 101 in a vehicle 100. Vehicle and vehicular are understood to refer to any means of transportation including non-limiting examples of motorcycles, cars, trucks, buses, excavation, earth moving, construction and farming equipment, railed vehicles like trains and trams, and watercraft like ships and boats. The electric propulsion system 101 may include various control components, electrical systems and electro-mechanical systems including, for example, a rechargeable energy storage system (RESS) 104 and an electric drive unit (EDU) 102. The electric propulsion system 101 may be employed on a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry and integration. An exemplary highly integrated EDU 102 may include, for example, a rotary electric machine such as an alternating current (AC) motor (motor) 120 and a traction power inverter module (TPIM) 106 including a motor controller 105 and a power inverter 110. The motor 120 may include a stator 120S and a rotor 120R coupled to a motor output shaft 125 and position sensor 182, for example a variable reluctance resolver or an encoder. The position sensor 182 may signally connect directly to the motor controller 105 and is employed to monitor angular position of the rotor ($\theta_e$) of the motor 120. The angular position of the rotor ($\theta_e$) of the motor 120 is employed by the motor controller 105 to control operation of the power inverter 110 that controls the motor 120.

The motor output shaft 125 may transfer torque between the motor 120 and driveline components (not illustrated), some of which may be integrated within the EDU 102, for example in a gearbox including reduction and differential gear sets and one or more axle outputs. The gearbox may simply include reduction gearing and a prop shaft output for coupling to a differential gear set. One or more axles may couple to the gear box directly or through final drive or differential gear sets if separate therefrom. Axle(s) may couple to a vehicle wheel(s) for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105.

Any controller may include one or more control modules. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing powertrain and vehicle operation. Alternatively, routines may be executed in response to occurrence of an event, software calls, or on demand via user interface inputs or requests.

The RESS 104 may, in one embodiment, include one or more electro-chemical battery packs 112, for example high capacity, high voltage (HV) rechargeable lithium ion battery packs for providing power to the vehicle via a HV direct current (DC) bus 108. The RESS 104 may also include a battery manager module 114. The RESS 104 may include one or more battery packs 112 constructed from a plurality of battery pack modules allowing for flexibility in configurations and adaptation to application requirements. Battery packs may include a plurality of battery pack modules constructed from a plurality of cells allowing for flexibility in configurations and adaptation to application requirements. Battery pack modules may include a plurality of cells allowing for flexibility in configurations and adaptation to application requirements. For example, in vehicular uses, the RESS 104 may be modular to the extent that the number of battery pack modules may be varied to accommodate a desired energy density or range objective of a particular vehicle platform, intended use, or cost target. Battery packs and battery pack modules may be variously and selectively configured in accordance with desired propulsion architecture and charging functions. It is understood that the RESS 104 may be reconfigurable at any level of integration including battery pack, battery module and cell.

The motor 120 may be a multi-phase AC motor receiving multi-phase AC power over a multi-phase motor control power bus (AC bus) 111 which is coupled to the power inverter 110. In one embodiment, the motor 120 is a three-phase motor and the power inverter 110 is a three-phase inverter. The power inverter 110 may include a plurality of solid-state switches in a solid-state switching section. The power inverter 110 couples to DC power over the HV DC bus 108 (DC input voltage ($V_{dc}$)) from the RESS 104, for example at 400 or 800 volts. The motor controller 105 is coupled to the power inverter 110 for control thereof. The power inverter 110 electrically connects to stator phase windings of a three-phase stator winding of the motor 120 via the AC bus 111, with electric current ($I_{abc}$) monitored on two or three phases thereof. The power inverter 110 may be configured with suitable control circuits including paired power transistors (e.g., IGBTs) for transforming high-voltage DC voltage on the HV DC bus 108 to high-voltage three-phase AC voltage ($V_{abc}$) on the AC bus 111 and transforming high-voltage three-phase AC voltage ($V_{abc}$) on the AC bus 111 to high-voltage DC voltage on the HV DC bus 108. The power inverter 110 may employ any suitable pulse width modulation (PWM) control, for example sinusoidal pulse width modulation (SPWM) or space vector pulse width modulation (SVPWM), to generate switching vector signals ($S_{abc}$) 109 to convert stored DC electric power originating in the battery pack 112 of the RESS 104 to AC electric power to drive the motor 120 to generate torque. Similarly, the power inverter 110 may convert mechanical power transferred to the motor 120 to DC electric power to generate electric energy that is storable in the battery pack 112 of the RESS 104, including as part of a regenerative braking control strategy. The power inverter 110 may be configured to receive the switching vector signals ($S_{abc}$) 109 from motor controller 105 and control inverter states to provide the motor drive and regeneration functionality. Switching vector signals ($S_{abc}$) 109 may also be referred to herein as conduction commands.

Control of the power inverter 110 may include high frequency switching of the solid-state switches in accordance with the PWM control. A number of design and application considerations and limitations determine inverter switching frequency and PWM control. Inverter controls for AC motor applications may include fixed switching frequencies, for example switching frequencies around 10-30 kHz and PWM controls that minimize switching losses of the IGBTs or other power switches of the power inverter 110.

Figure 2A:
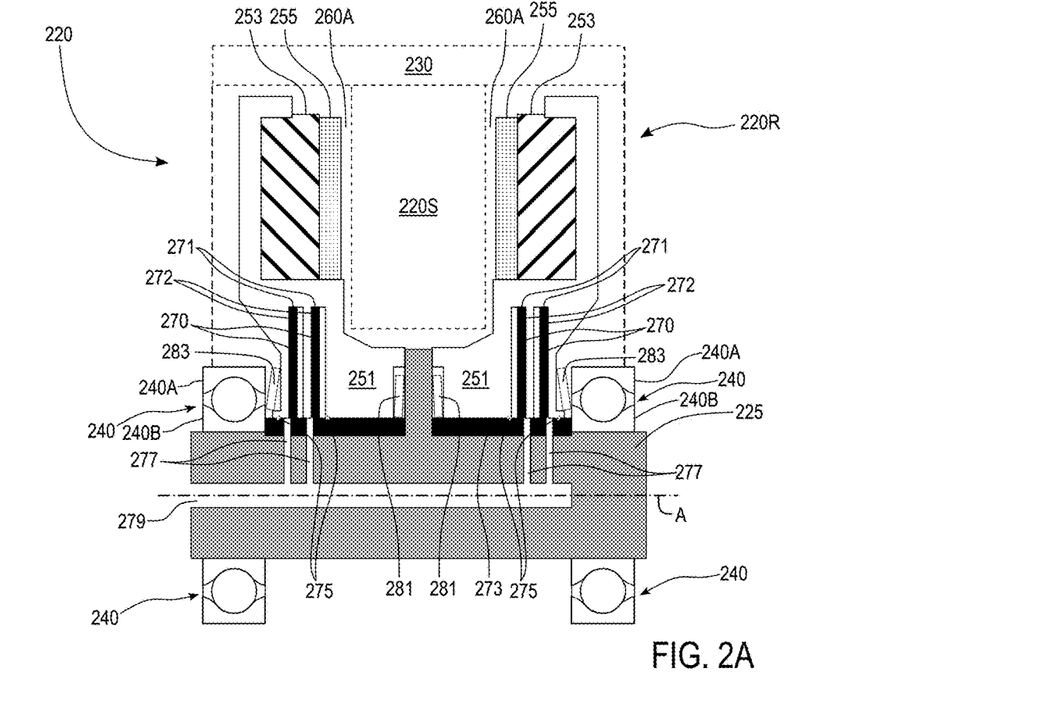
FIGS. 2A and 2B illustrate an axial flux motor, in accordance with one or more embodiments.
Figure 2B:
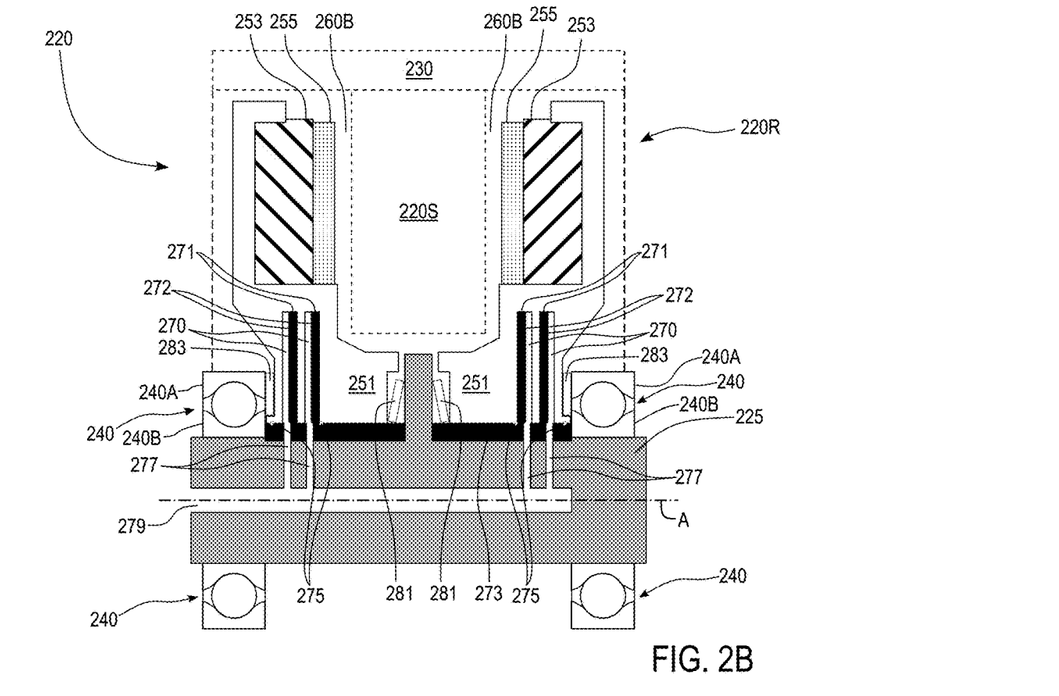
Figure 3A:
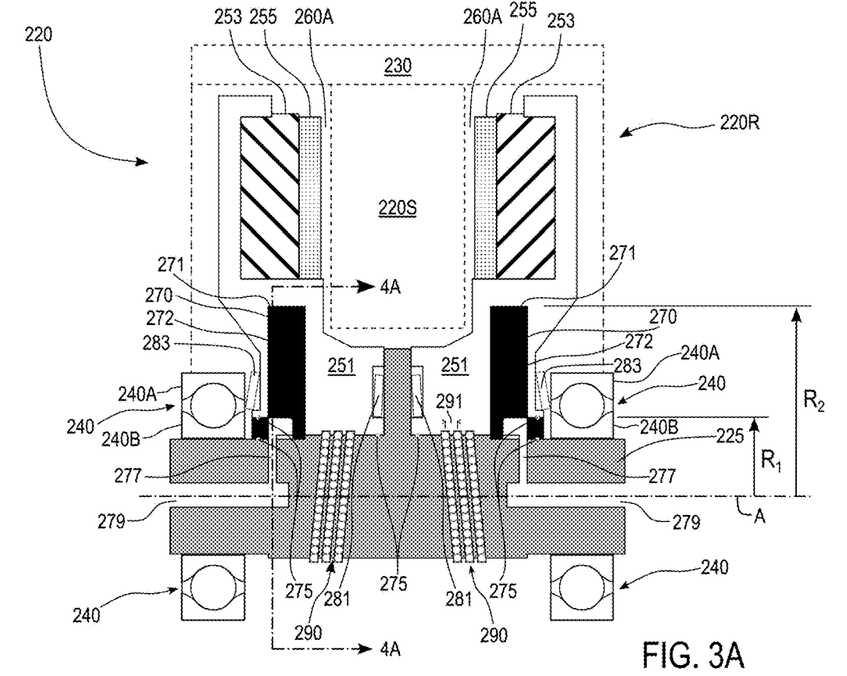
FIGS. 3A and 3B illustrate an axial flux motor, in accordance with one or more embodiments.
Figure 3B:
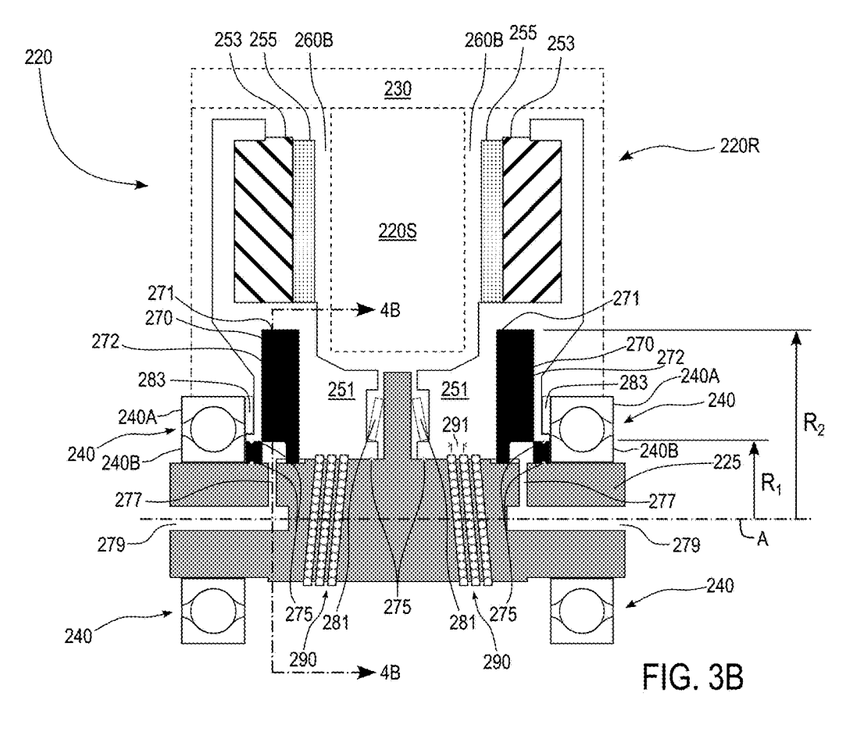

The motor 120 in the EDU 102 of the electric propulsion system 101 in one embodiment may be a permanent magnet axial flux (PMAF) motor. The disclosed improvement relates to mechanically based field weakening apparatus and control of such a motor. FIGS. 2A and 2B schematically illustrates one embodiment of a PMAF motor 220 in pertinent parts and FIGS. 3A and 3B schematically illustrates another embodiment of a PMAF motor 220 in pertinent parts. The motor 220 may include a stator 220S, a rotor 220R, and a motor output shaft 225. A motor frame 230 may support the stator 220S and bearings 240. The bearings 240 in turn rotatably support the motor output shaft 225. Each bearing 240 may include an outer ring 240A affixed to the motor frame 230, rolling elements (e.g., balls, rollers, etc.), and an inner ring 240B affixed to the motor output shaft 225, for example through mounting hardware such as an inner ring extension/concentric collar or a tapered adapter sleeve/locking washer/nut complement. The stator 220S may be unitary including a common core or may be segmented and coreless. The rotor 220R may include rotor structure on one or both axial sides of the stator 220S. In one embodiment as illustrated, the rotor 220R includes rotor structure on both axial sides of the stator 220S. In another embodiment, the rotor 220R includes rotor structure on just one axial side of the stator 220S. Further description herein will refer to one rotor structure on one side of the stator 220S for ease of description and understanding. The rotor structure may include a rotor frame 251, rotor core 253 and permanent magnets 255. The rotor core 253 may be affixed to the rotor frame 251 for rotation therewith. Permanent magnets 255 may be affixed to the rotor core 253 for rotation therewith and with the rotor frame 251. The rotor frame 251 may be formed from a soft magnetic composite material for example and the rotor core 253 may be made from electric steel laminations for example. In the illustrated embodiments of FIGS. 2A/2B and 3A/3B, the permanent magnets are surface mounted to the rotor core 253 and arranged between the rotor core 253 and the stator 220S with air gaps 260 therebetween. In alternate embodiments, the permanent magnets 255 may be contained within the rotor core 253 with the air gaps 260 between the rotor core 253 and the stator 220S.

The rotor 220R may be movable along the rotational axis (A) of the rotor 220R. Thus, the air gaps 260A/260B may be varied. In the illustrated embodiments, FIGS. 2A and 3A show first relatively narrow air gaps 260A whereas FIGS. 2B and 3B show second relatively wide air gaps 260B. The relatively narrow air gaps 260A may represent a minimum attainable air gap for the motor within its mechanical design constraints, for example 1 mm. The relatively wide air gaps 260B may represent a maximum attainable air gap for the motor within its mechanical design constraints, for example 2 mm. In each of the embodiments 2A/2B and 3A/3B, axial displacement of the rotor 220R along the rotational axis (A) may be controlled by hydraulic fluid within variable volume hydraulic fluid chambers as further described herein.

In the embodiment of FIGS. 2A and 2B, the rotor 220R may include at least one hydraulic fluid chamber 270 within the rotor frame 251. FIGS. 2A and 2B illustrate an embodiment including two hydraulic fluid chambers 270 stacked axially. FIGS. 2A and 2B also only illustrate one hydraulic actuator in section at one angular orientation of the rotor 220R, it being understood that multiple such hydraulic actuators may be angularly distributed around the entire rotor 220R for system balance requirements and overall hydraulic force multiplication proportional to the number of hydraulic actuators and hydraulic fluid chambers which may advantageously allow for lower system hydraulic pressures. Each hydraulic fluid chamber 270 may include a cavity 272 formed in the rotor frame 251 and a vein plate 271 extending radially outward from a cylindrical base 273 which surrounds the motor output shaft 225. The cylindrical base 273 is affixed to the motor output shaft 225 such that it is rotationally and axially immovable relative to the motor output shaft 225. Thus, the vein plate 271 of the hydraulic fluid chamber is rotationally and axially static with respect to the motor output shaft and rotates therewith. The rotor frame 251 is affixed to the cylindrical base 273 such that it is axially translatable. The cavity 272 in the rotor frame 251 encloses the vein plate 271 and together therewith defines the hydraulic fluid chamber 270. Thus, the vein plate 271 and the rotor frame rotate together. Elastomeric seals 275 may provide hydraulic sealing at the axially translatable interface of the rotor frame 251 to the cylindrical base 273. Hydraulic fluid may be communicated to and from the hydraulic fluid chamber 270 via passages 277 and a channel 279 through the motor output shaft 225. Volume changes in the hydraulic fluid chamber 270 correspond to axial translation of the rotor frame 251. Inner disc springs 281 between the motor output shaft 225 and the rotor frame 251 may provide a bias force when compressed, thus urging the rotor frame 251 away from the stator 220S. Similarly, outer disc springs 283 between the bearing inner ring 240B (or inner ring mounting hardware) and the rotor frame 251 may provide a bias force when compressed, thus urging the rotor frame toward the stator 220S. The hydraulic system of the embodiment of FIGS. 2A and 2B may be referred to as a linear hydraulic actuator system wherein the hydraulic actuator working surface area may correspond to the total rotor frame surface area opposing the vein plates 271 within the hydraulic fluid chambers 270.

In the embodiment of FIGS. 2A and 2B, the stroke travel of the linear hydraulic actuator corresponds one-to-one to the axial translation of the rotor frame 251. Thus, small air gap changes (e.g., 1 mm) may advantageously be accomplished as rapidly and such linear hydraulic actuator arrangement may be advantageous in a two-state air gap control including a narrow air gap (e.g., 1 mm) at a first axial travel limit of the rotor frame 251 and a wide air gap (e.g., 2 mm) at a second travel limit of the rotor frame 251.

In operation, pressurized hydraulic fluid may be supplied to the hydraulic fluid chamber 270 via the passages 277 and a channel 279 in the motor output shaft 225 to translate the rotor 220R axially along the rotational axis (A) of the rotor 220R away from the stator 220S to increase the air gap 260. The hydraulic fluid may be exhausted from the hydraulic fluid chamber 270 via the passages 277 and the channel 279 in the motor output shaft 225 to translate the rotor 220R axially along the rotational axis (A) of the rotor 220R toward the stator 220S to decrease the air gap 260. In one embodiment, translation of the rotor 220R to decrease the air gap 260 may be effected by the force exerted by the compressed outer disc springs 283 between the bearing inner ring 240B (or inner ring mounting hardware) and the rotor frame 251 and the magnetic attractive force of the permanent magnets 255.

Figure 4A:
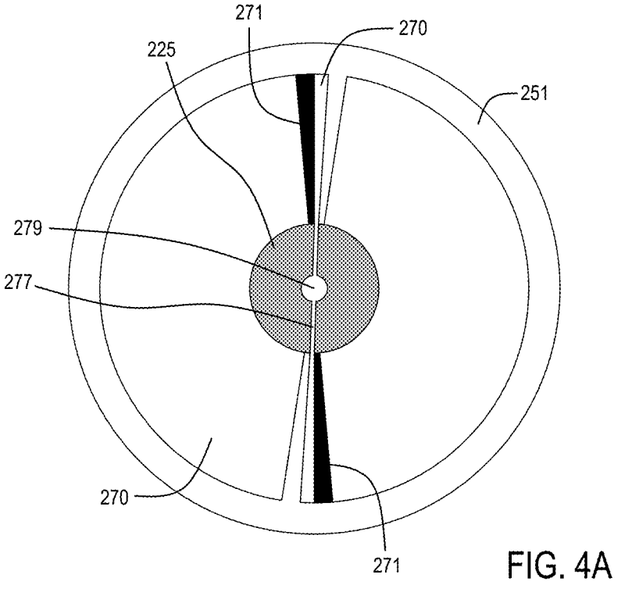
FIGS. 4A and 4B illustrate schematic sectional views of the axial flux motor of FIGS. 3A and 3B, in accordance with one or more embodiments.
Figure 4B:
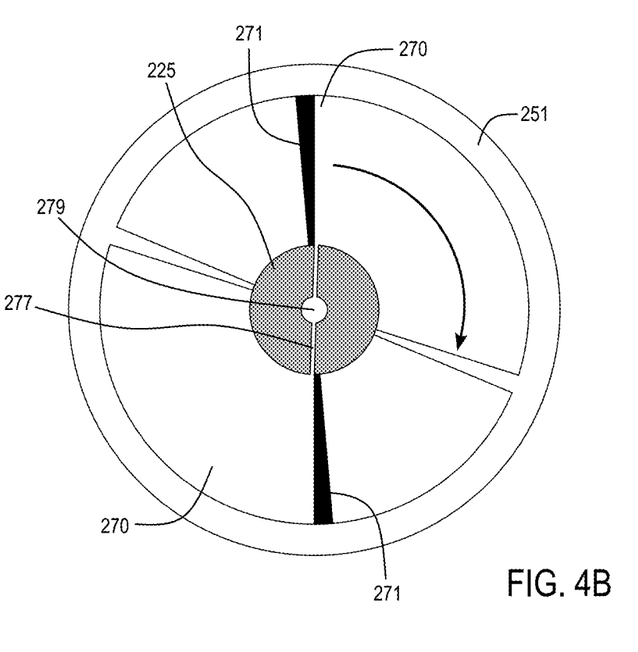

In the embodiment of FIGS. 3A and 3B, the rotor 220R may include at least one hydraulic fluid chamber 270 within the rotor frame 251. Additional reference is made to FIGS. 4A and 4B which schematically illustrate partial sectional views taken along the respective lines 4A-4A and 4B-4B in FIGS. 3A and 3B, respectively. FIGS. 3A and 3B illustrate one hydraulic actuator in section at one angular orientation of the rotor 220R, it being understood that multiple such hydraulic actuators may be angularly distributed around the entire rotor 220R for system balance requirements and overall hydraulic force multiplication proportional to the number of hydraulic actuators and hydraulic fluid chambers which may advantageously allow for lower system hydraulic pressures. FIGS. 4A and 4B, for example, illustrate two angularly balanced (i.e., 180 degrees separation) hydraulic fluid chambers 270 within the rotor frame 251. Each hydraulic fluid chamber 270 may include a cavity 272 formed in the rotor frame 251 and a vein plate 271 extending radially outward from the motor output shaft 225. The vein plate 271 is affixed to the motor output shaft 225 such that it is rotationally immovable relative to the motor output shaft 225 but is axially translatable, for example by a splined coupling between the motor output shaft 225 and the vein plate 271. Thus, the vein plate 271 of the hydraulic fluid chamber is rotationally static with respect to the motor output shaft and rotates therewith and may translate axially along the rotational axis (A) of the rotor 220R. The cavity 272 in the rotor frame 251 encloses the vein plate 271 and together therewith defines the hydraulic fluid chamber 270. The rotor frame 251 is affixed to the motor output shaft 225 such that it is rotatable relative to the vein plate 271 and the motor output shaft 225 in accordance with volume changes of the hydraulic fluid chamber and is axially translatable with the vein plate 271 relative to the motor output shaft 225. The rotor frame 251 axial and rotational movement is constrained to the motor output shaft by a lead screw coupling therebetween. In the illustrated embodiment of FIGS. 3A and 3B, the lead screw coupling is shown as a low friction ball screw 290. The ball screw 290 may include a ball return through the rotor frame 251 (not illustrated) or may be free-wheeling with a ball cage (not shown). Volume changes in the hydraulic fluid chamber 270 correspond to rotation of the rotor frame 251 relative to the vein plate 271 and the motor output shaft 225 which results in axial translation of the vein plate 271 and the rotor frame 251 via the ball screw 290 proportionally to the rotation of the rotor frame 251 corresponding to the screw pitch 291 of the ball screw 290. Thus, the vein plate 271 and the rotor frame 251 may axially move together in accordance with volume changes in the hydraulic fluid chamber 270 (i.e., rotation of the rotor frame 251 relative to the vein plate 271). Otherwise, the vein plate 271 and the rotor frame may be hydraulically locked together thus locking them axially and rotationally to the motor output shaft 225. Elastomeric seals 275 may provide hydraulic sealing at the axially translatable interfaces of the rotor frame 251 to the motor output shaft 225 and of the vein plate 271 to the motor output shaft 225. Hydraulic fluid may be communicated to and from the hydraulic fluid chamber 270 via passages 277 and a channel 279 through the motor output shaft 225. Inner disc springs 281 between the motor output shaft 225 and the rotor frame 251 may provide a bias force when compressed, thus urging the rotor frame 251 away from the stator 220S. Similarly, outer disc springs 283 between the bearing inner ring 240B (or inner ring mounting hardware) and the rotor frame 251 may provide a bias force when compressed, thus urging the rotor frame toward the stator 220S. The hydraulic system of the embodiment of FIGS. 3A, 3B, 4A and 4B may be referred to as a rotary hydraulic actuator system wherein the hydraulic actuator working surface area may correspond to the total rotor frame surface area opposing the vein plate 271 within the hydraulic fluid chamber 270.

In the embodiment FIGS. 3A and 3B, the stroke travel of the rotary hydraulic actuator corresponds to proportional fractional axial translation of the rotor frame 251. For example, a pitch 291 of 2 mm on the ball screw 290 would result in 1 mm of axial translation of the rotor frame for 180 degrees of rotation thereof. Thus, small air gap changes (e.g., 1 mm) may advantageously be accomplishes in a substantially continuous manner and such a rotary hydraulic actuator arrangement may be advantageous in a continuous air gap control between a narrow air gap (e.g., 1 mm) at a first axial travel limit of the rotor frame 251 and a wide air gap (e.g., 2 mm) at a second travel limit of the rotor frame 251.

In operation, pressurized hydraulic fluid may be supplied to the hydraulic fluid chamber 270 via the passages 277 and a channel 279 in the motor output shaft 225 to rotate the rotor frame 251 relative to the vein plate 271 and the motor output shaft 225 thereby translating the vein plate 271 and the rotor frame 251 via the ball screw 290 axially along the rotational axis (A) of the rotor 220R away from the stator 220S to increase the air gap 260. The hydraulic fluid may be exhausted from the hydraulic fluid chamber 270 via the passages 277 and the channel 279 in the motor output shaft 225 to rotate the rotor frame 251 relative to the vein plate 271 and the motor output shaft 225 thereby translating the vein plate 271 and the rotor frame 251 via the ball screw 290 axially along the rotational axis (A) of the rotor 220R toward the stator 220S to decrease the air gap 260. In one embodiment, translation of the rotor 220R to decrease the air gap 260 may be effected by the force exerted by the compressed outer disc springs 283 between the bearing inner ring 240B (or inner ring mounting hardware) and the rotor frame 251 and the magnetic attractive force of the permanent magnets 255.

It is appreciated that in both embodiments of FIGS. 2A/2B and FIGS. 3A/3B all axial translation forces of the rotor structure are advantageously contained withing the rotating components of the rotor and within the envelope generally between the axially static bearings 240. Thus, while the bearing inner ring 240B and/or the associated inner ring mounting hardware may be axially loaded through the outer disc springs 283, the loading is ultimately transferred to the motor output shaft 225 and does not cross the bearing through the rolling elements.

Figure 5A:
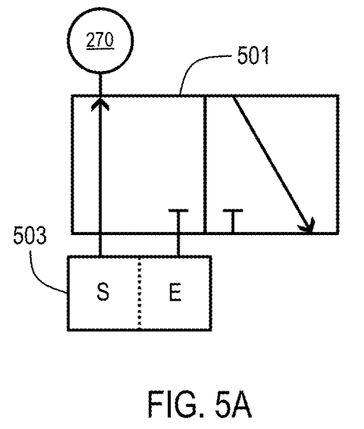
FIGS. 5A and 5B illustrate a schematic control mechanism for an axial flux motor, in accordance with one or more embodiments.
Figure 5B:
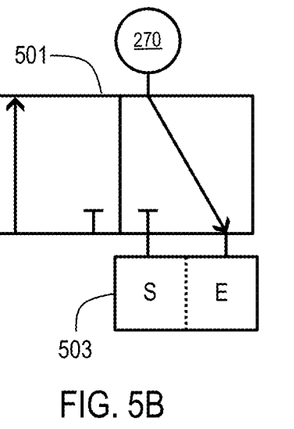

FIGS. 5A and 5B schematically illustrate a control mechanism for actuated and unactuated hydraulic control states, respectively, for establishing the rotor 220R axial positions corresponding to narrow and wide air gaps 260A and 260B, respectively. Pressurized hydraulic fluid may be provided to the hydraulic fluid chamber 270 (FIG. 5A) or hydraulic fluid may be exhausted from the hydraulic fluid chamber 270 (FIG. 5B). A binary fluid control valve (e.g., solenoid controlled spool valve) 501 is illustrated in a first state (FIG. 5A) connecting a pressurized hydraulic fluid from a high pressure supply side (S) of a hydraulic system 503 (e.g., pressurized line, pump outlet, accumulator, etc.) to the hydraulic fluid chamber 270. The binary fluid control valve 501 is illustrated in a second state (FIG. 5B) connecting the hydraulic fluid chamber 270 to a low pressure exhaust side (E) of the hydraulic system 503 (e.g., pump inlet, reservoir, sump, etc.).

Hydraulic pressure requirements may be determined in accordance with a force balance relationship in the case of the linear hydraulic actuator embodiment of FIGS. 2A and 2B modeled by a force balance relationship as follows:

$$P \times A = F \quad [1]$$

wherein P is the minimum hydraulic pressure required to move the hydraulic actuator;
A is total hydraulic actuator working surface area; and
F is force opposing the hydraulic actuator.

The force F opposing the hydraulic actuator may be primarily from permanent magnet attractive forces. The total hydraulic actuator working surface area A may be the summation of the hydraulic actuator working surface areas of all hydraulic fluid chambers.

In the embodiment of FIGS. 2A and 2B, there are two hydraulic fluid chambers each having a respective hydraulic actuator working surface area, $A_1$ and $A_2$ wherein $A=(A_1+A_2)$. Such relationship may be solved for the minimum hydraulic pressure P required to move the hydraulic actuator. An exemplary motor 220 may have permanent magnet attractive force of substantially 10,000 N and hydraulic actuator working surface areas of $A_1=A_2=5890$ $mm^2=0.00589$ $m^2$ for a total hydraulic actuator surface working area $A=A_1+A_2=2\times0.00589$ $m^2=0.01178$ $m^2$. Thus, the minimum hydraulic pressure required to move the hydraulic actuator P=10,000 N/0.01178 $m^2$=848,896 N/$m^2$ (approx. 8.5 bar). The above relationship ignores bias force from the inner disc spring 281 between the motor output shaft 225 and the rotor frame 251. Assuming a compressed spring force of substantially one-half the permanent magnet attractive force, inner disc spring 281 may reduce the force opposing the hydraulic actuator to substantially 5,000 N and the pressure required to move the hydraulic actuator P=5,000 N/0.01178 $m^2$=424,448 N/$m^2$ (approx. 4.2 bar). It is thus appreciated that increasing total hydraulic actuator working surface area A and/or reducing force F opposing the hydraulic actuator may reduce the minimum hydraulic fluid pressure required to move the hydraulic actuator P. Total hydraulic actuator working surface area may be increased by axially stacking hydraulic fluid chambers (e.g., as illustrated in the dual chamber arrangements of FIGS. 2A and 2B) and/or configuring multiple such arrangements angularly distributed around the entire rotor 220R.

Hydraulic pressure requirements may be determined in accordance with a torque balance relationship in the case of the rotary hydraulic actuator embodiment of FIGS. 3A and 3B modeled by a torque balance relationship as follows:

$$P \times (A \times r) = T \quad [2]$$

wherein P is the minimum hydraulic pressure required to move the hydraulic actuator;
A is total hydraulic actuator working surface area;
r is the equivalent radius of the hydraulic actuator working surface; and
T is torque opposing the hydraulic actuator.

The force T opposing the hydraulic actuator may be primarily from permanent magnet attractive forces. The total hydraulic actuator working surface area A may be the summation of the hydraulic actuator working surface areas of all hydraulic fluid chambers.

In the embodiment of FIGS. 3A, 3B, 4A and 4B there are two chambers each having a respective hydraulic actuator working surface area, $A_1$ and $A_2$ wherein $A=(A_1+A_2)$. Such relationship may be solved for the minimum hydraulic pressure P required to move the hydraulic actuator. An exemplary motor 220 may have permanent magnet attractive force of substantially 10,000 N. This force may be related to the torque opposing the hydraulic actuator T through a ball screw relationship as follows:

$$T = \frac{F \times L}{2\pi} \quad [3]$$

wherein F is the permanent magnet attractive force; and L is the axial distance per revolution (i.e., lead).

Thus, in the present example, the torque opposing the hydraulic actuator T=(10,000 N×2 mm)/2π=(10,000 N×0.000002 m)/2π=0.0032 N-m.

The exemplary motor 220 may have hydraulic actuator working surface areas of $A_1=A_2=600$ mm²=0.0006 m² for a total hydraulic actuator surface working area $A=(A_1+A_2)$ =2×0.0006 m²=0.0012 m². The exemplary motor 220 may have a hydraulic actuator working surface inner radius $R_1$=25 mm and outer radius $R_2$=55 mm. Thus, the equivalent radius r of the hydraulic actuator working surface may be determined from the following relationship:

$$r = \frac{\sqrt{R_1^2 + R_2^2}}{2} \quad [4]$$

Thus, in the present example, r=√[(25 mm)²+(55 mm)²]/2=0.000030 m and the minimum hydraulic pressure required to move the hydraulic actuator P=T/(A×r)=0.0032 N-m/ (0.0012 m²×0.000030 m)=88,889 N/m² (approx. 0.89 bar). The above relationship ignores bias force from the inner disc spring 281 between the motor output shaft 225 and the rotor frame 251. Assuming a compressed spring force of substantially one-half the permanent magnet attractive force, inner disc spring 281 may reduce the force opposing the hydraulic actuator to substantially 5,000 N and the pressure required to move the hydraulic actuator P by one half or about 44,445 N/m² (approx. 0.44 bar). It is thus appreciated that increasing total hydraulic actuator working surface area A and/or reducing force F opposing the hydraulic actuator may reduce the minimum hydraulic fluid pressure required to move the hydraulic actuator P. Total hydraulic actuator working surface area may be increased by adding hydraulic fluid chambers angularly distributed around the entire rotor 220R. However, it is understood that more hydraulic fluid chambers on the same axial location may further limit the angular range of motion of the hydraulic actuators.

Figure 6:
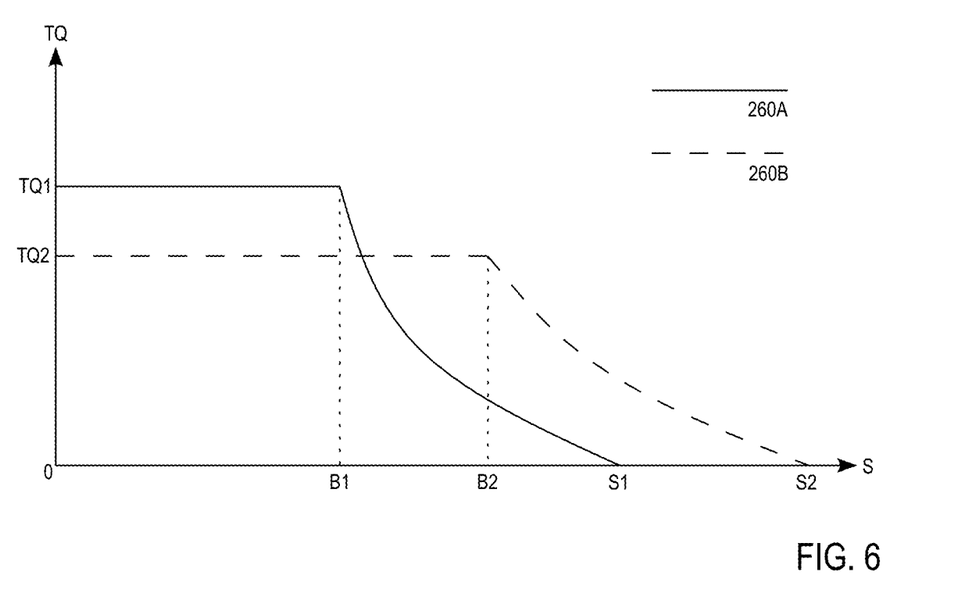
FIG. 6 illustrates exemplary torque (TQ) versus motor speed (S) curves, in accordance with one or more embodiments.

FIG. 6 illustrates exemplary torque (TQ) versus motor speed (S) curves corresponding to motor operation at relatively narrow air gaps 260A (i.e., FIGS. 2A and 3A) and relatively wide air gaps 260B (i.e., FIGS. 2B and 3B). Relative motor torque (TQ) is plotted along the vertical axis with increasing torque away from zero at the origin (O) and relative motor speed (S) is plotted along the horizontal axis with increasing speed away from the origin (O). Narrow air gap 260A operation may exhibit a constant torque output TQ1 from zero speed until a base speed B1 corresponding to the narrow air gap 260A, whereafter motor operation in the constant power region at higher speeds exhibits characteristic reduced torque output until a terminal speed S1. Wide air gap 260B operation may exhibit a constant torque output TQ2 from zero speed until a base speed B2 corresponding to the wide air gap 260B, whereafter motor operation in the constant power region at higher speeds exhibits characteristic reduced torque output until a terminal speed S2. Thus, it is appreciated that the narrow air gap 260A may have a higher available torque at lower motor speeds and more limited torque output at higher motor speeds. It is further appreciated that the wide air gap 260B may have a lower available torque at lower motor speeds but less limited torque output at higher motor speeds. The extended speed and torque operating range of the motor with a wide air gap 260B may be attributed to the field weaking achieved by the larger physical air gap.

In an automotive application such as an electric propulsion system 101 in a vehicle 100 as described herein, it is appreciated that adjustable air gaps in an axial flux motor 220 may provide for selective, mechanical flux weakening. Such selective control may be effected by way of the binary fluid control valve 501 hydraulic system 503 as described herein with respect to FIGS. 5A and 5B. The binary fluid control valve may be 501 may be controlled in response to a control signal from a control module, for example the vehicle controller 103 and/or the motor controller 105 as described herein with respect to FIG. 1. Advantageously, mechanical flux weakening through widening the air gap above the motor base speed corresponding to a narrow air gap may reduce copper losses associated with alternative electrically induced field weakening controls (e.g., current injections). Advantageously, the air gap may be controlled wider at low vehicle loads to reduce motor cogging torque. Efficiency gains may be realized by operating wider air gaps when stator core losses exceed copper losses. And, widening the air gap may advantageously extend useful torque/speed operation in the constant power operating region of the motor above the base speed corresponding to a narrow air gap through the beneficial mechanical flux weakening. It is further appreciated that in an automotive application such as an electric propulsion system 101 in a vehicle 100 as described herein, adjustable air gaps in an axial flux motor 220 may provide for selective operator selectable vehicle response mode control. For example, an economy mode associated with light acceleration and steady powertrain loading may benefit from a wide air gap setting. Similarly, a sport mode associated with spirited acceleration, busy throttle use and more rapid throttle tip-ins and tip-outs may benefit from a narrow air gap at least with the constant torque operating region below the motor base speed corresponding to a narrow air gap.

The terminology used herein is for the purpose of describing particular embodiments only and is not intended to be limiting. The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An axial flux motor, comprising:
   a stator;
   a rotor including a rotor frame and having a rotational axis;
   an axial air gap separating the stator and the rotor, the axial air gap corresponding to an axial position of the rotor frame;
   a plurality of hydraulic actuators comprising a plurality of variable volume hydraulic fluid chambers defined within the rotor frame, wherein a change in the volume of the variable volume hydraulic fluid chamber causes a change in the axial position of the rotor frame and a corresponding change in the axial air gap separating the stator and the rotor; and
   wherein the plurality of hydraulic actuators are angularly distributed around the rotor.

2. The axial flux motor of claim 1, wherein the at least one hydraulic actuator comprises a linear hydraulic actuator.

3. The axial flux motor of claim 2, further comprising a motor output shaft including a passage communicating hydraulic fluid to the variable volume hydraulic fluid chamber, wherein the variable volume hydraulic fluid chamber comprises a cavity in the rotor frame enclosing a vein plate, the vein plate extending radially outward from a cylindrical base surrounding the motor output shaft, the cylindrical base affixed to the motor output shaft such that the cylindrical base is rotationally and axially fixed relative to the motor output shaft, the rotor frame affixed to the cylindrical base such that the rotor frame is axially translatable.

4. The axial flux motor of claim 1, wherein the at least one hydraulic actuator comprises a rotary hydraulic actuator.

5. The axial flux motor of claim 4, further comprising a motor output shaft including a passage communicating hydraulic fluid to the variable volume hydraulic fluid chamber, wherein the variable volume hydraulic fluid chamber comprises a cavity in the rotor frame enclosing a vein plate, the vein plate extending radially outward from the motor output shaft, the vein plate affixed to the motor output shaft such that the vein plate is rotationally fixed relative to the motor output shaft and axially translatable relative to the motor output shaft, the rotor frame affixed to the motor output shaft such that the rotor frame is rotationally and axially translatable relative to the motor output shaft.

6. The axial flux motor of claim 5, wherein the rotor frame is affixed to the motor output shaft by a lead screw coupling.

7. The axial flux motor of claim 6, wherein the lead screw coupling comprises a ball screw.

8. The axial flux motor of claim 1, further comprising a motor output shaft including a passage communicating a hydraulic fluid to and from the variable volume hydraulic fluid chamber.

9. The axial flux motor of claim 8, further comprising a binary fluid control valve having a first state providing the hydraulic fluid to the hydraulic fluid chamber and a second state exhausting the hydraulic fluid from the hydraulic fluid chamber.

10. The axial flux motor of claim 1, further comprising a disc spring compressible during the change in the axial position of the rotor frame.

11. The axial flux motor of claim 1, wherein the rotor comprises surface mounted permanent magnets.

12. The axial flux motor of claim 1, wherein the rotor frame is affixed to a motor output shaft by a lead screw coupling.

13. An axial flux motor, comprising:
   a stator;
   a rotor including a rotor frame and having a rotational axis;
   an axial air gap separating the stator and the rotor, the axial air gap corresponding to an axial position of the rotor frame;
   a motor output shaft;
   at least one hydraulic actuator including a variable volume hydraulic fluid chamber defined within the rotor frame, the variable volume hydraulic fluid chamber comprising a cavity in the rotor frame enclosing a vein plate, the vein plate extending radially outward from a cylindrical base surrounding the motor output shaft, the cylindrical base affixed to the motor output shaft such that the cylindrical base is rotationally and axially immovable relative to the motor output shaft, the rotor frame affixed to the cylindrical base such that the rotor frame is axially translatable, wherein a change in the volume of the variable volume hydraulic fluid chamber causes a change in the axial position of the rotor frame and a corresponding change in the axial air gap separating the stator and the rotor;

the motor output shaft communicating a hydraulic fluid to and from the variable volume hydraulic fluid chamber; and a binary fluid control valve having a first state providing the hydraulic fluid to the hydraulic fluid chamber and a second state exhausting the hydraulic fluid from the hydraulic fluid chamber.

14. The axial flux motor of claim 13, further comprising a spring biasing the rotor away from the stator when compressed.

15. The axial flux motor of claim 13, further comprising a spring biasing the rotor toward from the stator when compressed.

16. An axial flux motor, comprising:
a rotational axis of the motor;
a stator having a pair of axial sides;
a rotor including a respective rotor structure on each axial side of the stator, each rotor structure including a rotor frame;
a respective axial air gap separating the stator and each respective rotor structure, each axial air gap corresponding to an axial position of the corresponding rotor frame;
for each rotor structure, at least one respective hydraulic actuator comprising a corresponding variable volume hydraulic fluid chamber defined within the respective rotor frame, wherein a change in the volume of the corresponding variable volume hydraulic fluid chamber causes a change in the axial position of the respective rotor frame and a corresponding change in the corresponding axial air gap separating the stator and the respective rotor structure, and for each rotor structure the corresponding variable volume hydraulic fluid chamber comprises a respective cavity in the respective rotor frame enclosing a respective vein plate, the respective vein plate extending radially outward from a respective cylindrical base surrounding a motor output shaft, the respective cylindrical base affixed to the motor output shaft such that the respective cylindrical base is rotationally and axially fixed relative to the motor output shaft, the respective rotor frame affixed to the respective cylindrical base such that the respective rotor frame is axially translatable; and a binary fluid control valve having a first state providing a hydraulic fluid to each variable volume hydraulic fluid chamber and a second state exhausting the hydraulic fluid from each variable volume hydraulic fluid chamber.

17. The axial flux motor of claim 16, wherein for each rotor structure the at least one respective hydraulic actuator comprises a linear hydraulic actuator.

18. The axial flux motor of claim 16, wherein for each rotor structure the at least one respective hydraulic actuator comprises a rotary hydraulic actuator.

19. The axial flux motor of claim 16, wherein the rotor frame is affixed to the motor output shaft by a lead screw coupling.

* * * * *